United States Patent
Onufryk et al.

(10) Patent No.: US 7,587,439 B1
(45) Date of Patent: Sep. 8, 2009

(54) METHOD AND APPARATUS FOR GENERATING A RANDOM BIT STREAM IN TRUE RANDOM NUMBER GENERATOR FASHION

(75) Inventors: Peter Z. Onufryk, Flanders, NJ (US); Nelson L. Yue, San Jose, CA (US)

(73) Assignee: Intergrated Device Technology, Inc., San Jose, CA (US)

( * ) Notice: Subject to any disclaimer, the term of this patent is extended or adjusted under 35 U.S.C. 154(b) by 955 days.

(21) Appl. No.: 10/222,543

(22) Filed: Aug. 16, 2002

Related U.S. Application Data

(60) Provisional application No. 60/316,399, filed on Aug. 31, 2001.

(51) Int. Cl.
*G06F 7/58* (2006.01)
(52) U.S. Cl. ...................... 708/250; 708/251
(58) Field of Classification Search .......... 708/250–256
See application file for complete search history.

(56) References Cited

U.S. PATENT DOCUMENTS

| | | | |
|---|---|---|---|
| 4,641,102 A | 2/1987 | Coulthart et al. | |
| 4,905,176 A * | 2/1990 | Schulz | 708/252 |
| 5,007,087 A * | 4/1991 | Bernstein et al. | 708/250 |
| 5,706,218 A | 1/1998 | Hoffman | |
| 5,961,577 A * | 10/1999 | Soenen et al. | 708/251 |
| 6,862,605 B2 * | 3/2005 | Wilber | 708/255 |
| 6,954,770 B1 * | 10/2005 | Carlson et al. | 708/251 |
| 2002/0035586 A1 * | 3/2002 | Szajnowski | 708/252 |
| 2002/0186086 A1 * | 12/2002 | Curiger et al. | 708/251 |
| 2003/0014452 A1 * | 1/2003 | Le Quere | 708/250 |

OTHER PUBLICATIONS

R. C. Fairfield, R. L. Mortenson, and K. B. Coulthart. An LSI random number generator (RNG). In G. R. Blakley and David Chaum, editors, Advances in Cryptology: Proceedings of CRYPTO 84, vol. 196 of Lecture Notes in Computer Science, pp. 203-230, Aug. 19-22, 1984. Springer-Verlag, 1985.

* cited by examiner

*Primary Examiner*—Chat C Do
(74) *Attorney, Agent, or Firm*—Kenneth Glass; Molly Sauter; Victor H. Okumoto

(57) ABSTRACT

A method and apparatus for generating a random bit stream in true random number generator fashion are described. Two periodic signals are employed in generating the random bit stream. A first periodic signal having preferably an approximately fifty percent duty cycle and jitter induced by supply and substrate noise is sampled by a second periodic signal that is relatively jitter-free and of a lower frequency than the first periodic signal.

40 Claims, 5 Drawing Sheets

METHOD AND APPARATUS FOR GENERATING A RANDOM BIT STREAM IN TRUE RANDOM NUMBER GENERATOR FASHION

CROSS REFERENCE TO RELATED APPLICATIONS

This application claims priority to U.S. provisional application Ser. No. 60/316,399 filed Aug. 31, 2001.

FIELD OF THE INVENTION

The present invention generally relates to random number generators and in particular, to a method and apparatus for generating a random bit stream in true random number generator fashion.

BACKGROUND OF THE INVENTION

Cryptographic applications make extensive use of random number generators. One use of random number generators in such applications is to produce secret keys. As is well known, secret keys should exhibit a high level of unpredictability for optimal security. Although pseudorandom number generators are frequently used in cryptographic applications, they provide less than optimal results, because they use deterministic processes to generate a series of outputs from an initial seed or state value.

Therefore, a true random number generator (TRNG) that uses a non-deterministic source as a basis to produce random numbers is highly desirable. Common non-deterministic sources include thermal noise, atmospheric noise, and nuclear decay.

An example of how one known TRNG operates is illustrated in FIG. 1. In this example, two free running oscillators are employed. One oscillator generates a fast periodic signal 101, and the other oscillator generates a relatively slow periodic signal 102. Thermal noise modulates the slow periodic signal 102 so that there is variation (indicated by the hashed area) in its edges. The slow periodic signal 102 is then used to sample the fast periodic signal 101, and the drift caused by the modulation between the two periodic signals provides a source of random binary digits. The resulting probability distribution 103 indicates the likelihood of a "1" in the shaded areas, and a "0" in the non-shaded areas under the curve.

OBJECTS AND SUMMARY OF THE INVENTION

Accordingly, it is an object of the present invention to provide a method for generating a random bit stream in true random number generator fashion.

Another object is to provide an apparatus for generating a random bit stream that functions as a true random number generator.

These and additional objects are accomplished by the various aspects of the present invention, wherein briefly stated, one aspect is a method for generating a random bit stream, comprising: generating a first periodic signal having jitter; and generating a random bit stream by sampling the first periodic signal with a second periodic signal that is relatively jitter-free and has a lower frequency than the first periodic signal.

Another aspect is a method for generating a random bit stream, comprising: receiving a first periodic signal having jitter; and generating a random bit stream by sampling the first periodic signal with a second periodic signal that is relatively jitter-free and has a lower frequency than the first periodic signal.

Another aspect is a method for generating a random bit stream comprising: receiving an oscillating signal subjected to random noise; generating a first periodic signal by passing the oscillating signal through a frequency divider, thereby restoring its duty cycle to an approximately fifty percent duty cycle; and generating a random bit stream by sampling the first periodic signal with a second periodic signal that is relatively jitter-free and has a lower frequency than the first periodic signal.

Still another aspect is an apparatus for generating a random bit stream. A ring oscillator circuit has inverting stages subjected to noise for generating an oscillating signal having jitter. A duty cycle restorer circuit generates a first periodic signal from the oscillating signal so as to exhibit jitter and an approximately fifty percent duty cycle. A sampling circuit then generates a random bit stream by sampling the first periodic signal with a second periodic signal relatively jitter-free with a lower frequency than the first periodic signal.

Another aspect is an apparatus for generating a random bit stream. A duty cycle restorer circuit generates a first periodic signal from an oscillating signal having jitter so as to have an approximately fifty percent duty cycle. A sampling circuit then generates a random bit stream by sampling the first periodic signal with a second periodic signal relatively jitter-free with a lower frequency than the first periodic signal.

Yet another aspect is a random bit source generator. A plurality of bit source oscillators provides random bit streams that are generated using the supply and substrate noise on an integrated circuit chip as jitter sources. A first mixing circuit then generates an enhanced random bit stream by performing a mixing function on the random bit streams.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
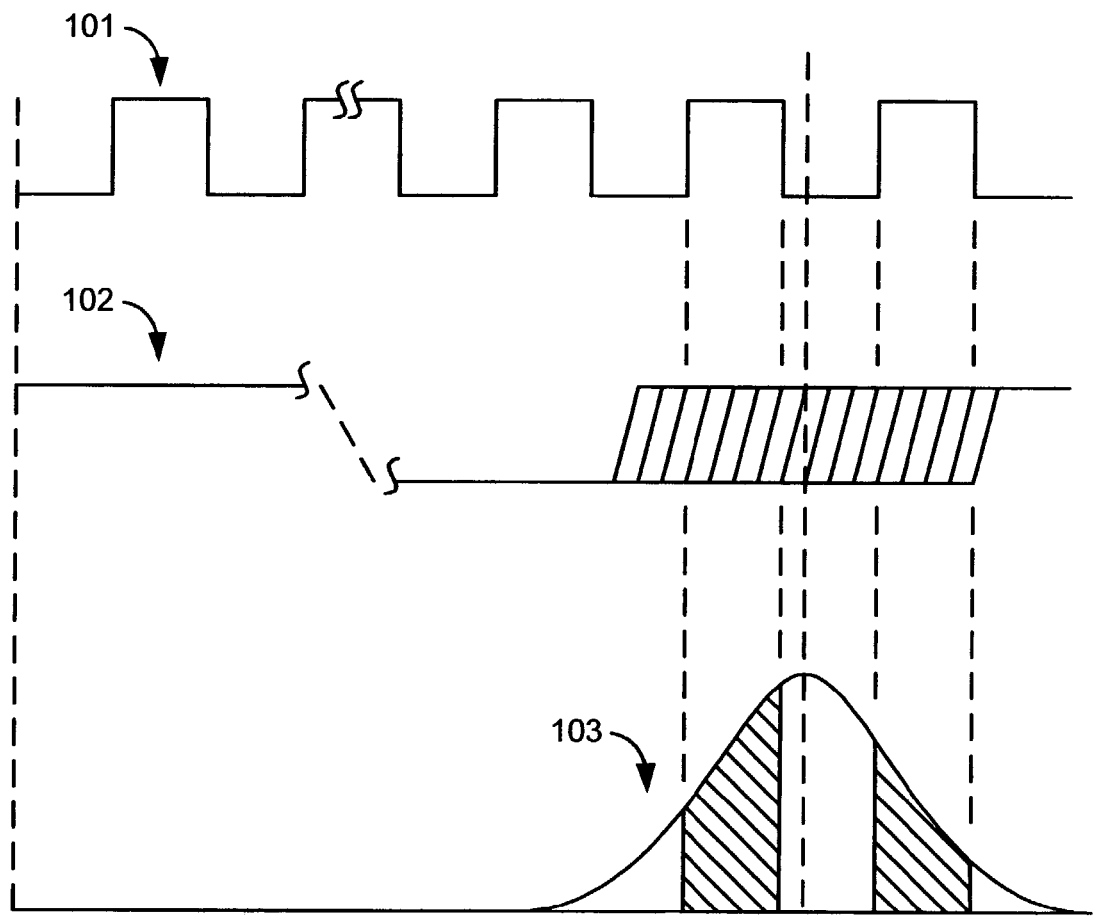
FIG. 1 illustrates, as an example, timing diagrams and a corresponding distribution curve for a prior art random number generator.
Figure 2:
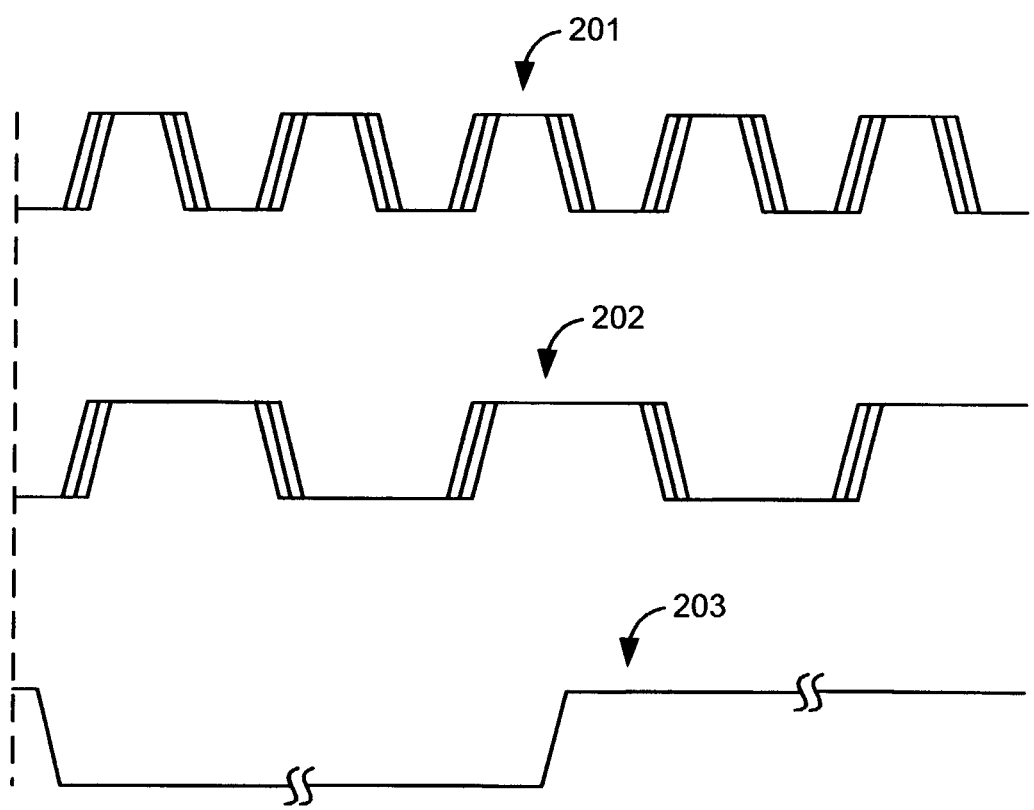
FIG. 2 illustrates, as an example, timing diagrams corresponding to a method and apparatus for generating a random bit stream, utilizing aspects of the present invention.

FIG. 2 illustrates timing diagrams corresponding to a method and apparatus for generating a random bit stream. As in the prior art technique described in reference to FIG. 1, two periodic signals are employed wherein a relatively slower periodic signal 203 (i.e., the one having a lower frequency) is used to sample a relatively faster periodic signal 202 (i.e., the one having a higher frequency). Unlike the prior art technique described in reference to FIG. 1, however, the higher frequency signal 202 is subjected to noise so as to evidence jitter (e.g., multi-edge appearance in 202) rather than the lower frequency signal 203 which in this case, is relatively jitter-free.

In a preferred embodiment, the high frequency signal 202 derives from an even higher frequency signal 201 that is subjected to random supply and substrate noise to induce jitter. Since the oscillating signal 201 has undeterminable duty-cycle variation due to the induced jitter, a frequency divider (single-edge triggered) is then optionally used to generate the high frequency signal 202 from the oscillating signal 201 so that the resulting high frequency signal 202 has approximately a fifty percent duty cycle. It is this approximately fifty percent duty cycle, edge-jitter induced signal 202 that is then sampled by the lower frequency signal 203.

As can be readily appreciated, the use of the present invention may simplify the clock requirement in a system dramatically over that of the prior art technique described in reference to FIG. 1. The reason for such simplification is that the system clock (or local bus clock), as conventionally generated by a phase-locked loop circuit, may now be used for the second periodic signal since the second periodic signal in this scheme is to be relatively jitter-free.

Figure 3:
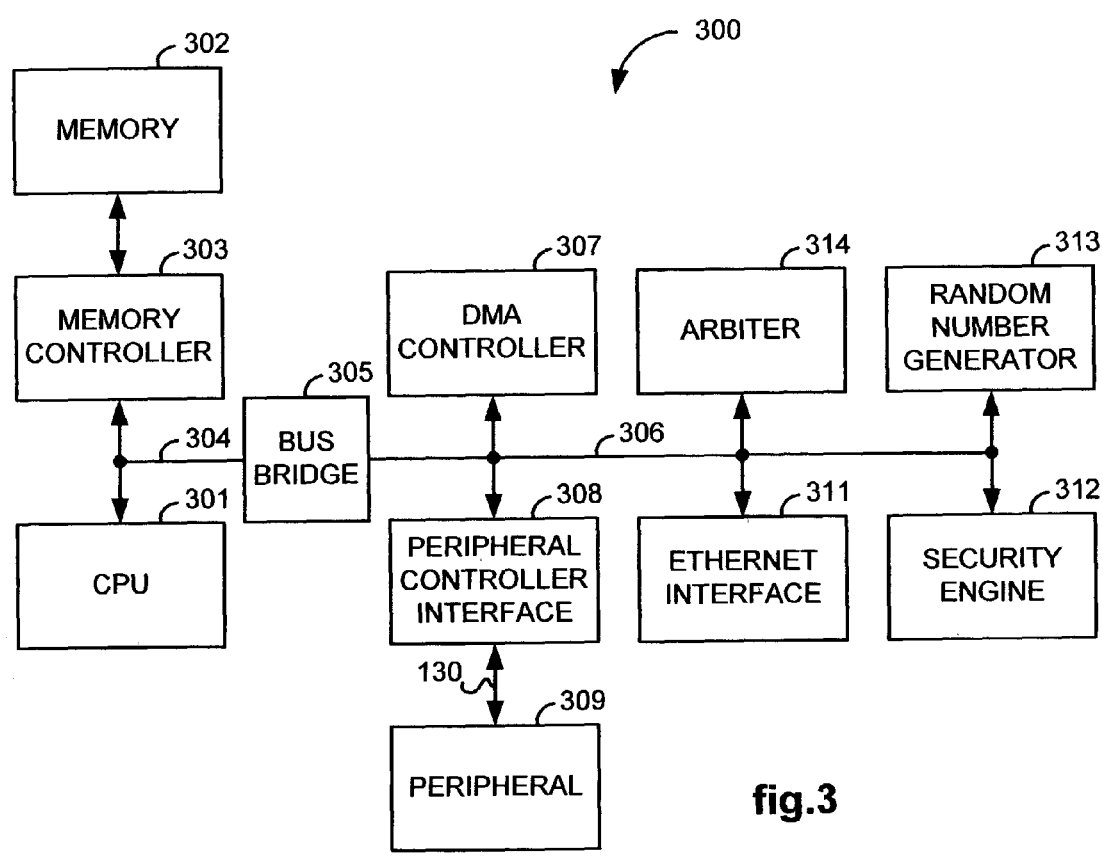
FIG. 3 illustrates, as an example, a block diagram of a computer system on an integrated circuit chip including a random number generator, utilizing aspects of the present invention.

FIG. 3 illustrates a block diagram of a computer system 300 implemented on an integrated circuit chip. The computer system 300 conventionally includes a central processing unit (CPU) 301, memory 302 and memory controller 303 coupled through a system bus 304. A bus bridge 305 couples the system bus 304 to a local or IP bus 306. A DMA controller 307, bus arbiter 314, and peripheral controller interface 308 are coupled to the local bus 306. A peripheral 309 is conventionally coupled to the peripheral controller interface 308 through a peripheral bus 130. An Ethernet interface 311, security engine 312, and random number generator 313 are also coupled to the local bus 306.

Although a two-bus system is illustrated in FIG. 3, for the purposes of the present invention, it does not matter whether the random number generator 313 is coupled to the local bus 306 or the system bus 304 (or any other bus that the random number generator might be coupled to). Therefore, for the purposes of the appended claims, the terms shall be considered interchangeable so that reference to a system bus therein shall mean the system bus 304 or the local bus 306 or any other bus that a random number generator incorporating aspects of the present invention may be coupled to. Likewise, reference to a system clock therein shall mean the system clock, a local bus clock, or any other bus clock coupled to the random number generator.

Figure 4:
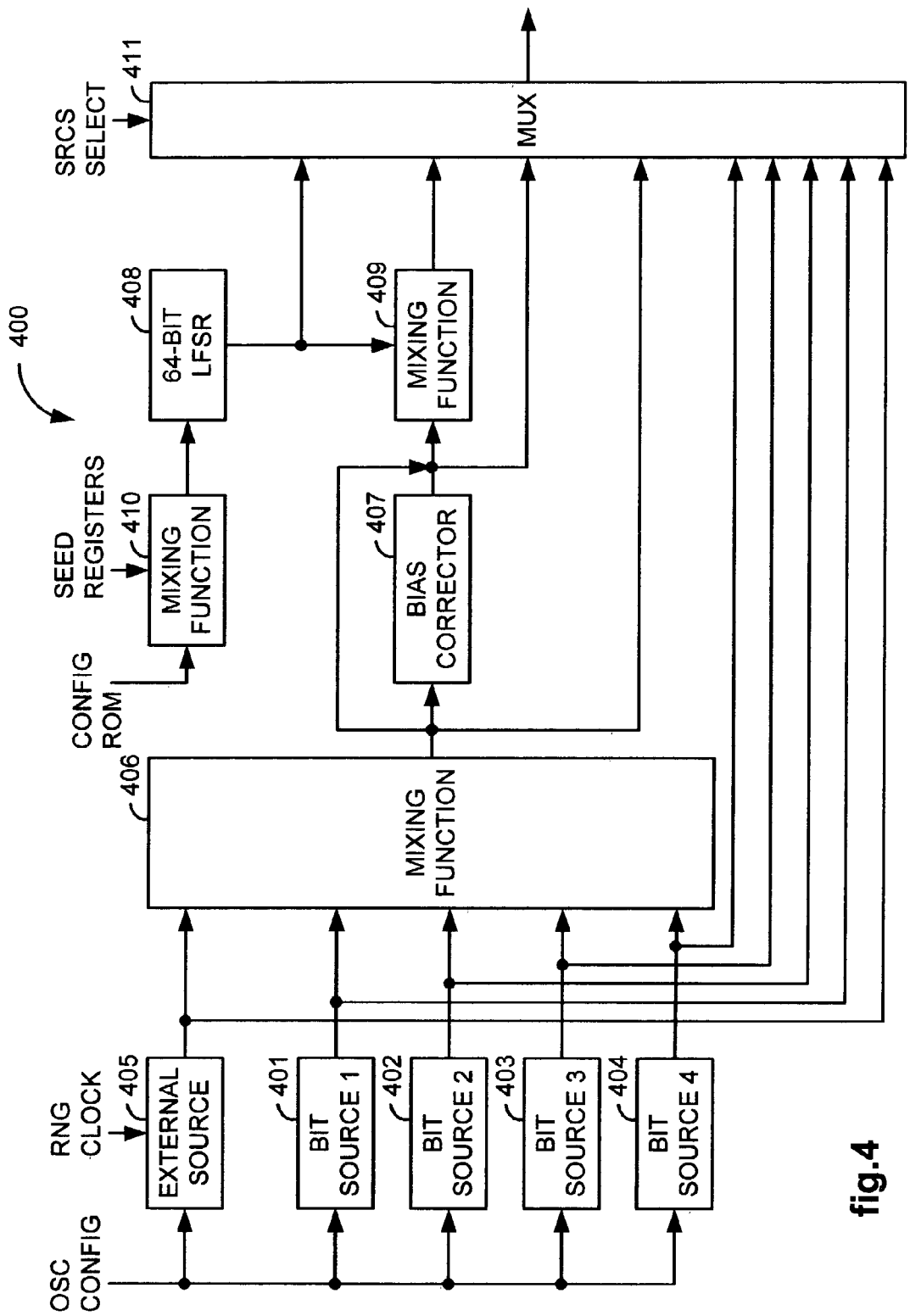
FIG. 4 illustrates, as an example, a block diagram of a random bit source generator included in a random number generator, utilizing aspects of the present invention.

FIG. 4 illustrates a block diagram of a random bit source generator 400 included in the random number generator 313 of FIG. 3. The random bit source generator 400 includes bit source oscillators 401~404 that provide random bit streams generated using supply and substrate noise on an integrated circuit chip as jitter sources. The integrated circuit chip in this case is the integrated circuit chip including the computer system 300, as previously described.

Preferably, the bit source oscillators 401~404 are dispersed throughout the integrated circuit chip so as to be subjected to supply and substrate noise from different parts of the integrated circuit chip. In this way, local circuit influences are minimized.

Also included is an accommodation for an external random bit source clocked in with a random number generator (RNG) clock through external source conditioning circuit 405. Oscillator configuration control signal(s) OSC CONFIG provided by other circuitry in the random number generator 313 (or directly from the CPU 301) enable/disable individual of bit source oscillators 401~404 and external source circuit 405. For example, when the external random bit source is to be used, the external source circuit 405 may be enabled while the bit source oscillators 401~404 are disabled. Conversely, when the external random bit source is not to be used, the external source circuit 405 may be disabled while the bit source oscillators 401~404 are all or selectively enabled. A first mixing circuit 406 performs a mixing function on random bit streams received from enabled ones of the bit source oscillators 401~404 and external source circuit 405. The mixing function may be an SHA-1 or other commonly used mixing function, or, as in this case, a simpler exclusive-OR (XOR) logic operation for reduced cost. The output of the mixing circuit 406 is then processed through a bias corrector circuit 407 to remove bit biasing and thereby, generate an enhanced random bit stream. The bias corrector circuit 407 may be separate from the mixing circuit 406, or integrated into and part of the mixing circuit 406.

A 64-bit linear feedback shift register (LFSR) 408 functions as a pseudorandom pattern generator that is responsive to a seed value for generating a pseudorandom bit stream. The pseudorandom bit stream in this case is preferably unique to the integrated circuit chip. A second mixing circuit 409 performs a mixing function on the enhanced random bit stream provided by the bias corrector circuit 407 and the pseudorandom bit stream provided by the 64-bit LFSR 408. The seed value to the 64-bit LFSR 408 is provided by a third mixing circuit 410 that performs a mixing function on manufacturing information provided from a configuration ROM (not shown) and programmed seed values provided from seed registers (not shown) that may be programmed in real-time during or right before generation of the random bit stream.

The manufacturing information in this case includes information preferably unique to the integrated circuit device, such as an identification number identifying the manufacturer of the integrated circuit device, a lot number identifying a manufacturing lot from which the integrated circuit device came from, a wafer number identifying a wafer from which the integrated circuit device came from in the manufacturing lot, and X-Y coordinate information identifying a location on the wafer where a die of the integrated circuit device came from.

A multiplexer circuit (MUX) 411 then receives the output of the second mixing circuit 408, as well as several pick-off points in the random bit source generator 400, and provides an output of a random bit stream or pattern that is useful for cryptographic applications such as those performed by the security engine 312 in the computer system 300. A source control signal (SRCS) selects the one input to the MUX 411 that is to be passed through to its output. The MUX 411, in this case, is primarily used as a design-for-test (DFT) feature in the random source generator 400 for additional observability of the various random bit stream paths in the random source generator 400.

Figure 5:
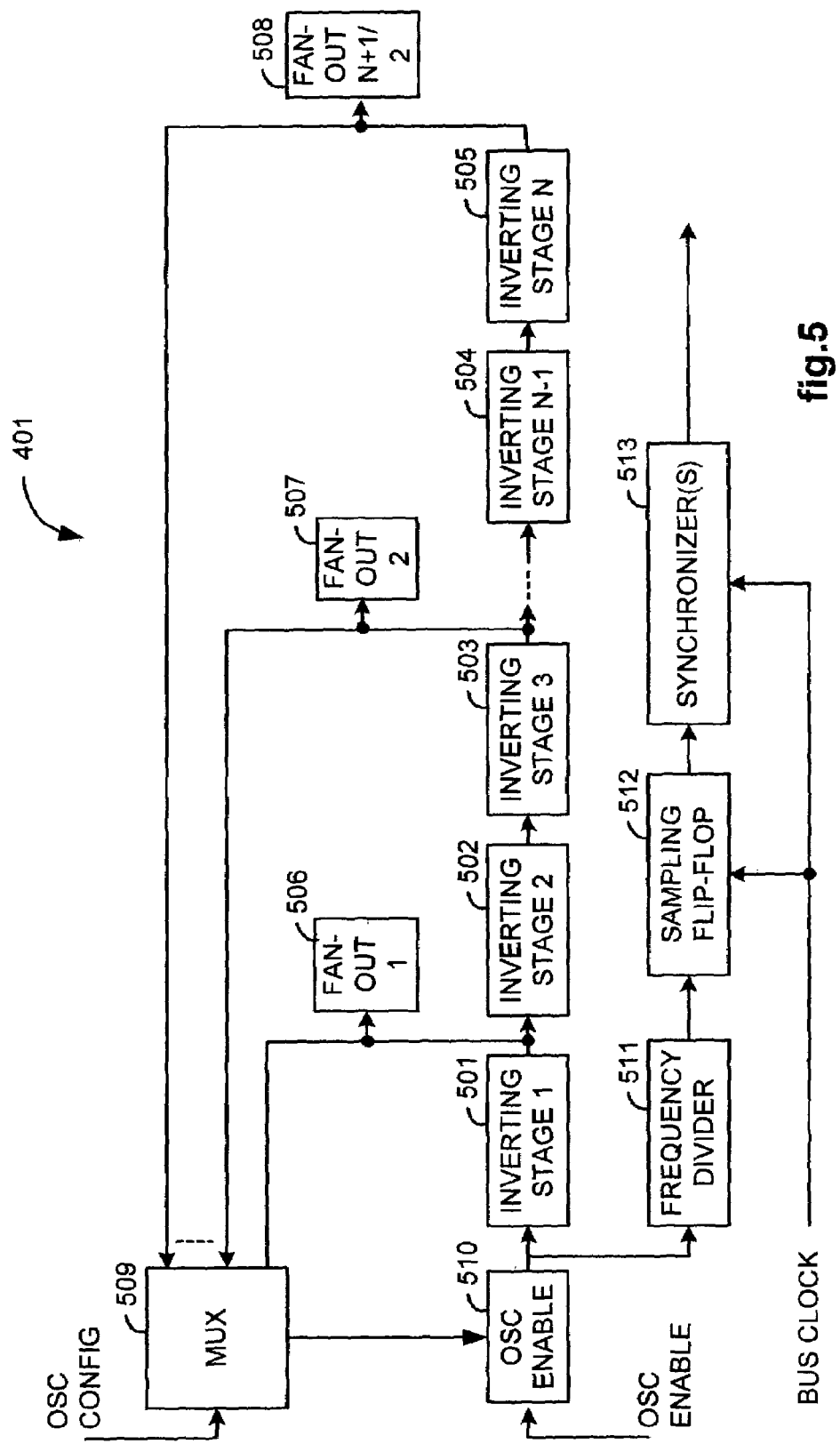
FIG. 5 illustrates, as an example, a block diagram of a bit source oscillator included in a random bit source generator, utilizing aspects of the present invention.

FIG. 5 illustrates a block diagram of the bit source oscillator 401 included in the random bit source generator 400 of FIG. 4. Bit source oscillators 402~404 are similarly constructed.

The bit source oscillator 401 includes a ring oscillator circuit that is formed by selectably coupling together, in a feedback ring fashion, inverting stages, such as inverting stages 501~505, through a multiplexer circuit (MUX) 509. Since the inverting stages 501~505 are single-ended inverting stages, the number of inverting stages should be odd in order for the ring oscillator to generate an oscillating signal. Therefore, feedback pick-off points are taken after each odd number of inverting stages. Also coupled to each of the feedback pick-off points are fan-out circuits, such as fan-out circuits 506~508. Each of the fan-out circuits may further include selectable amounts of fan-out that are selected by appropriate values placed on control signals (not shown) to the fan-out circuits. Thus, by placing appropriate values on the oscillation configuration signal (OSC CONFIG) to the select input of the MUX 509 (and also, as appropriate, on control signals to the fan-out circuits), the ring oscillator circuit is of selectable fan-out (i.e., total load on the inverter stages) and length (i.e., number of inverter stages in the ring oscillator circuit).

Preferably, each of the inverting stages 501~505 is a single-ended inverting stage such as a single-ended NOT logic, XOR logic, NAND logic or NOR logic gate. Single-ended inverting stages are preferred in this case, because they are more sensitive to the supply and substrate noise generated on the integrated circuit chip, than differential inverting stages. Jitter is therefore induced on the oscillating signal generated by the ring oscillator circuit from the supply and substrate noise.

An oscillation enable (OSC ENABLE) circuit 510 is included in the ring oscillator circuit so that it can turn the generation of the oscillation signal on and off according to the state of an oscillation enable signal (OSC ENABLE) provided to the OSC ENABLE circuit 510.

A frequency divider circuit 511 functions as a duty cycle restorer circuit by receiving the jitter exhibiting oscillation signal from the output of the OSC ENABLE circuit 510, and generating a first periodic signal having jitter from it and an approximately fifty percent duty cycle at the quotient frequency. A sampling flip-flop 512 then functions as a sampling circuit for generating a random bit stream by sampling the first periodic signal with a bus clock signal that is relatively jitter-free and at a lower frequency than the first periodic signal.

Thus, referring back to FIG. 2, the input to the frequency divider circuit 511 resembles the oscillating signal with jitter 201, the output of the frequency divider circuit 511 resembles the first periodic signal 202, and the bus clock signal should resemble the second periodic signal 203, as described in reference thereto, so as to generate the random bit stream in true random number generator fashion.

A hard-wait synchronizer circuit 513 then buffers the random bit stream so that any metastability conditions in the random bit stream resulting from the flip-flop 512 sampling the output of the frequency divider 511 have sufficient time to settle to valid logic values, and then provides the random bit stream to the first mixing circuit 406 in synch with outputs of the other bit source oscillators 402~404. Typically, this entails that the outputs of all output synchronizer circuits in the bit source oscillators 401~404 are read out at the same time under control of a common control signal.

Although not shown, a block diagram of the external source conditioning circuit 405 would preferably resemble the bit source oscillator 401 depicted in FIG. 5 without the ring oscillator circuit, so that the externally provided random bit source is clocked through a pass gate or other circuit performing a function such as OSC ENABLE circuit 510, a frequency divider such as frequency divider 511, a sampling flip-flop such as sampling flip-flop 512 clocked by a bus or system clock, and a synchronizer circuit such as synchronizer circuit 513.

Although the various aspects of the present invention have been described with respect to a preferred embodiment, it will be understood that the invention is entitled to full protection within the full scope of the appended claims.

We claim:
1. A method for generating a random bit stream, comprising:
generating an oscillating signal subjected to random noise using a plurality of bit source oscillators to provide random bit streams generated using supply and substrate noise on an integrated circuit chip as jitter sources and tapping said oscillating signal from a ring oscillator circuit including single-ended inverting stages that are sensitive to supply and substrate noise;
generating a first periodic signal having jitter from the oscillating signal by passing said oscillating signal through a frequency divider, thereby restoring its duty cycle to an approximately fifty percent duty cycle;
generating a second periodic signal that is relatively jitter-free and has a lower frequency than said first periodic signal;
sampling the first periodic signal with the second periodic signal to generate a random bit stream; and
coupling the random bit stream to a security engine, the security engine operable to perform cryptographic applications using the random bit stream.
2. The method according to claim 1, wherein said second periodic signal is a system clock signal.
3. The method according to claim 2, wherein said system clock signal is generated by a phase locked loop.
4. The method according to claim 1, wherein said sampling the first periodic signal with the second periodic signal to generate a random bit stream is performed on an integrated circuit device, and said random noise derives from noise on a voltage reference line on said integrated circuit device.
5. The method according to claim 4, wherein said voltage reference line is affected by supply noise on said integrated circuit device.
6. The method according to claim 4, wherein said voltage reference line is affected by substrate noise on said integrated circuit device.
7. The method according to claim 1, wherein said single-ended inverting stages are selectably includable in said ring oscillator circuit.
8. The method according to claim 7, wherein individual of said single-ended inverting stages include fan-out loads, and said ring oscillator circuit further includes a selection circuit for selectably including individual of said single-ended inverting stages into said ring oscillator circuit so that said ring oscillator circuit is of selectable fan-out and length.
9. The method according to claim 8, wherein said selection circuit includes a multiplexer having inputs coupled to outputs of individual of said single-ended inverting stages, and an output coupled to an input of one of said single-ended inverting stages.
10. The method according to claim 1, wherein said single-ended inverting stages include NOT logic.
11. The method according to claim 1, wherein said single-ended inverting stages include XOR logic.
12. The method according to claim 1, wherein said single-ended inverting stages include NAND logic.
13. The method according to claim 1, wherein said single-ended inverting stages include NOR logic.
14. An apparatus for generating a random bit stream, comprising:
a plurality of bit source oscillators providing random bit streams generated using a supply and substrate noise on an integrated circuit chip as a jitter source, wherein each of the plurality of bit source oscillators comprises a ring oscillator circuit including a plurality of inverting stages comprising single-ended inverting stages that are sensi- tive to said supply and substrate noise, said plurality of inverting stages subjected to said jitter source for generating an oscillating signal having jitter;

a duty cycle restorer circuit coupled to said ring oscillator circuit for generating a first periodic signal from said oscillating signal so as to exhibit jitter and an approximately fifty percent duty cycle; and a sampling circuit coupled to said duty cycle restorer circuit for generating a random bit stream by sampling said first periodic signal with a second periodic signal relatively jitter-free with a lower frequency than said first periodic signal.

15. The apparatus according to claim 14, wherein said second periodic signal is a system clock signal.

16. The apparatus according to claim 15, further comprising a phase locked loop circuit for generating said system clock signal relatively jitter-free.

17. The apparatus according to claim 14, wherein said duty cycle restorer circuit comprises a frequency divider circuit receiving said oscillating signal and providing said first periodic signal.

18. The apparatus according to claim 14, wherein said single-ended inverting stages are selectably includable in said ring oscillator circuit.

19. The apparatus according to claim 18, wherein individual of said single-ended inverting stages include fan-out loads.

20. The apparatus according to claim 19, wherein said ring oscillator circuit further comprises a selection circuit for selectably including individual of said single-ended inverting stages into said ring oscillator circuit so that said ring oscillator circuit is of selectable fan-out and length.

21. The apparatus according to claim 20, wherein said selection circuit comprises a multiplexer circuit having inputs coupled to outputs of individual of said single-ended inverting stages, and a output coupled to an input of one of said single-ended inverting stages.

22. The apparatus according to claim 14, wherein said single-ended inverting stages include NOT logic.

23. The apparatus according to claim 14, wherein said single-ended inverting stages include XOR logic.

24. The apparatus according to claim 14, wherein said single-ended inverting stages include NAND logic.

25. The apparatus according to claim 14, wherein said single-ended inverting stages include NOR logic.

26. The apparatus according to claim 14, wherein said duty cycle restorer circuit comprises a frequency divider circuit receiving said oscillating signal and providing said first periodic signal.

27. The apparatus according to claim 14, further comprising:
a first mixing circuit for generating an enhanced random bit stream from said random bit streams by performing a mixing function.

28. The apparatus according to claim 27, wherein said mixing function is an XOR mixing function.

29. The apparatus according to claim 27, wherein said first mixing circuit includes a bias corrector circuit to reduce bit biasing in providing said enhanced random bit stream.

30. The apparatus according to claim 27, further comprising:
a pseudorandom pattern generator responsive to a seed value for generating a pseudorandom bit stream; and
a second mixing circuit for generating a further enhanced random bit stream by performing a mixing function on said enhanced random bit stream and said pseudorandom bit stream.

31. The apparatus according to claim 30, wherein said pseudorandom pattern generator comprises a linear feedback shift register.

32. The apparatus according to claim 30, wherein said apparatus is formed on an integrated circuit device, and said seed value is unique to said integrated circuit device so that said pseudorandom bit stream is unique to said integrated circuit device.

33. The apparatus according to claim 32, wherein said seed value is formed from information including manufacturing information of said integrated circuit device.

34. The apparatus according to claim 33, wherein said manufacturing information includes an identification number identifying a manufacturer of said integrated circuit device.

35. The apparatus according to claim 33, wherein said manufacturing information includes a lot number identifying a manufacturing lot from which said integrated circuit device came from in said manufacturing lot.

36. The apparatus according to claim 33, wherein said manufacturing information includes a wafer number identifying a wafer from which said integrated circuit device came from in said manufacturing lot.

37. The apparatus according to claim 33, wherein said manufacturing information includes coordinate information identifying a location in said wafer where a die of said integrated circuit device came from.

38. The apparatus according to claim 30, further comprising:
a configuration ROM storing manufacturing information unique to said integrated circuit device;
a seed register storing a programmable seed value; and
a third mixing circuit for generating said seed value by performing a mixing function on said manufacturing information and said programmable seed value.

39. The apparatus according to claim 38, wherein said seed register is real-time programmable.

40. The apparatus according to claim 14, wherein said plurality of bit source oscillators are dispersed throughout said integrated circuit chip so as to be subjected to supply and substrate noise from different parts of said integrated circuit chip.

* * * * *